(12) United States Patent
Fadell (10) Patent No.: US 9,752,947 B2
(45) Date of Patent: Sep. 5, 2017

(54) THERMOELECTRIC HEATING, COOLING AND POWER GENERATION FOR DIRECT MOUNT AND DUAL COMPARTMENT FILL REMOTE SEAL SYSTEMS

(71) Applicant: P I Components Corp., Brenham, TX (US)

(72) Inventor: Paul Ryan Fadell, Cypress, TX (US)

(73) Assignee: P I Components Corp., Brenham, TX (US)

(*) Notice: Subject to any disclaimer, the term of this patent is extended or adjusted under 35 U.S.C. 154(b) by 0 days.

(21) Appl. No.: 15/277,129

(22) Filed: Sep. 27, 2016

(65) Prior Publication Data

US 2017/0016789 A1    Jan. 19, 2017

Related U.S. Application Data

(63) Continuation-in-part of application No. 14/493,679, filed on Sep. 23, 2014.

(51) Int. Cl.
*G01L 19/04* (2006.01)
*G01L 19/00* (2006.01)
(Continued)

(52) U.S. Cl.
CPC .............. *G01L 19/04* (2013.01); *B23P 19/04* (2013.01); *F16L 23/006* (2013.01); *F16L 53/00* (2013.01);
(Continued)

(58) Field of Classification Search
CPC ......... F16L 23/006; F16L 53/00; F25B 21/02; G01L 19/0046; G01L 19/0092; G01L 19/04; G01L 19/0681
See application file for complete search history.

(56) References Cited

U.S. PATENT DOCUMENTS 4,169,387 A    10/1979   Krempl
4,722,228 A *  2/1988   Awa ...................... G01F 23/164
                                                   73/301
(Continued)

FOREIGN PATENT DOCUMENTS

CA    1 192 418    8/1985
DE    2 211 609    9/1973
(Continued)

OTHER PUBLICATIONS

Model 1199 Diaphragm Seal Systems Manual, Rosemount, Fisher-Rosemount, 1997, p. iii-4-2.
(Continued)

*Primary Examiner* — Francis Gray
(74) *Attorney, Agent, or Firm* — Westman, Champlin & Koehler, P.A.

(57) ABSTRACT

A pressure transmitter assembly for measuring a process pressure of an industrial process includes a pressure sensor configured to sense the process pressure. A process coupling couples the pressure sensor to the industrial process using an elongate housing with a fill fluid capillary. In one example configuration, at least one thermoelectric element is included within the elongate housing to apply heat to, or conduct heat away from, the process coupling in response to an applied electric current or signal, allowing fill fluid to be preheated to facilitate cold startup or calibration, and providing cooling of the process coupling during high temperature operation.

20 Claims, 8 Drawing Sheets

(51) Int. Cl.
  *B23P 19/04* (2006.01)
  *F16L 23/00* (2006.01)
  *F16L 53/00* (2006.01)
  *G01L 19/06* (2006.01)

(52) U.S. Cl.
  CPC ...... *G01L 19/0046* (2013.01); *G01L 19/0092* (2013.01); *G01L 19/0681* (2013.01)

(56) References Cited

U.S. PATENT DOCUMENTS

| | | | |
|---|---|---|---|
| 5,046,365 A | 9/1991 | Kumley et al. | |
| 5,292,195 A | 3/1994 | Crisman, Jr. | |
| 5,495,768 A | 3/1996 | Louwagie et al. | |
| 5,709,337 A | 1/1998 | Moser et al. | |
| 6,038,961 A * | 3/2000 | Filippi | G01L 19/0645 29/454 |
| 6,059,254 A | 5/2000 | Sundet et al. | |
| 6,120,033 A * | 9/2000 | Filippi | G01L 19/0046 277/315 |
| 7,036,381 B2 | 5/2006 | Broden et al. | |
| 7,080,558 B2 | 7/2006 | Broden | |
| 7,258,017 B1 | 8/2007 | Hedtke | |
| 7,258,021 B2 | 8/2007 | Broden | |
| 7,373,831 B2 | 5/2008 | Broden | |
| 7,377,174 B2 | 5/2008 | Sundet | |
| 7,497,123 B1 * | 3/2009 | Behm | F28F 13/00 73/706 |
| 7,784,351 B2 | 8/2010 | Schumacher | |
| 7,980,481 B2 | 7/2011 | Fandrey et al. | |
| 2005/0126296 A1 | 6/2005 | Hedtke | |
| 2005/0284227 A1 | 12/2005 | Broden et al. | |
| 2006/0162458 A1 * | 7/2006 | Broden | G01L 13/025 73/708 |
| 2006/0162459 A1 | 7/2006 | Broden | |
| 2007/0220985 A1 | 9/2007 | Hedtke | |
| 2007/0234813 A1 | 10/2007 | Hedtke | |
| 2007/0272027 A1 | 11/2007 | Hedtke | |
| 2008/0083445 A1 * | 4/2008 | Chakraborty | H01L 35/30 136/205 |
| 2010/0307254 A1 | 12/2010 | Klosinski | |
| 2012/0192574 A1 * | 8/2012 | Ghoshal | F25B 21/02 62/3.2 |
| 2013/0005272 A1 | 1/2013 | Shah | |
| 2013/0005372 A1 * | 1/2013 | Strei | H01L 35/30 455/500 |
| 2014/0090476 A1 * | 4/2014 | Miller | G01L 19/0046 73/706 |
| 2016/0091383 A1 * | 3/2016 | Hoffman | G01L 19/0046 73/706 |

FOREIGN PATENT DOCUMENTS

| | | |
|---|---|---|
| DE | 25 23 869 | 12/1976 |
| DE | 2808469 | 9/1979 |
| DE | 297 03 013 | 5/1997 |
| DE | 10 2005 061 217 | 4/2007 |
| EP | 0 812 414 | 12/1997 |
| EP | 1 364 174 | 11/2003 |
| WO | WO 2009/078918 | 6/2009 |

OTHER PUBLICATIONS

Office Action from German Patent Application No. 102005012439.2, dated Jul. 23, 2007.
Office Action from Chinese Patent Application No. 200510054976.X, dated Aug. 24, 2007.
Invitation to Pay Additional Fees and Where Applicable, Protest Fee, from PCT/US2014/051628, dated Nov. 25, 2014.
Office Action from U.S. Appl. No. 14/501,691, dated Oct. 4, 2016.
Office Action from U.S. Appl. No. 14/501,691, dated May 18, 2016.
Notification of Transmittal of the International Search Report and the Written Opinion of the International Searching Authority for PCT/US2015/035244, dated May 19, 2016.
Invitation to Pay Additional Fees from PCT/US2015/035244, dated Feb. 11, 2016.
Notification of Transmittal of the International Search Report and the Written Opinion of the International Searching Authority for PCT/US2015/046657, dated Nov. 20, 2015.
Office Action from U.S. Appl. No. 14/493,679, dated Jul. 14, 2016.
Office Action from U.S. Appl. No. 14/493,679, dated Dec. 22, 2016.
Communication Pursuant to Rules 161(1) and 162 EPC from European Patent Application No. 15797472.6, dated Feb. 2, 2017.

* cited by examiner

THERMOELECTRIC HEATING, COOLING AND POWER GENERATION FOR DIRECT MOUNT AND DUAL COMPARTMENT FILL REMOTE SEAL SYSTEMS

CROSS REFERENCE TO RELATED APPLICATION

The present application is a continuation-in-part application of U.S. utility application Ser. No. 14/493,679, filed on Sep. 23, 2014 for COOLING FOR INDUSTRIAL PROCESS VARIABLE TRANSMITTERS, the content of which is hereby incorporated by reference in its entirety.

BACKGROUND

The present invention relates to process control transmitters of the type used in industrial process monitoring and control systems. More specifically, the present invention relates to transmitters which measure process variables in high or low temperature environments.

Process monitoring and control systems are used to monitor and control operation of industrial processes. Industrial processes are used in manufacturing to produce various products such as refined oil, pharmaceuticals, paper, foods, etc. In large scale implementations, these processes must be monitored and controlled in order to operate within the desired parameters.

"Transmitter" has become a term which is used to describe the devices which couple to the process equipment and are used to sense a process variable. Example process variables include pressure, temperature, flow, and others. Frequently, a transmitter is located at a remote location (i.e., in the "field"), and transmits the sensed process variable back to a centrally located control room. (However, field may also include devices positioned locally.) Various techniques are used for transmitting the process variable including both wired and wireless communications. One common wired communication technique uses what is known as a two wire process control loop in which a single pair of wires is used to both carry information as well as provide power to the transmitter. One well established technique for transmitting information is by controlling the current level through the process control loop between 4 mA and 20 mA. The value of the current within the 4 20 mA range can be mapped to corresponding values of the process variable.

One type of transmitter is a pressure transmitter. In general, a pressure transmitter is any type of a transmitter which measures a pressure of a fluid of the process. (The term fluid includes both gas and liquids and their combination.) Pressure transmitters can be used to measure pressures directly including differential, absolute or gauge pressures. Further, using known techniques, pressure transmitters can be used to measure flow or level of the process fluid based upon a pressure differential in the process fluid between two locations.

Typically, a pressure transmitter includes a pressure sensor which couples to the pressure of the process fluid through an isolation system. The isolating system can comprise, for example, an isolation diaphragm which is in physical contact with the process fluid and an isolation fill fluid which extends between the isolation diaphragm and the pressure sensor. The fill fluid preferably comprises a substantially incompressible fluid such as an oil. As the process fluid exerts a pressure on the isolation diaphragm, changes in the applied pressure are conveyed across the diaphragm, through the isolation fluid and to the pressure sensor. Such isolation systems prevent the delicate components of the pressure sensor from being directly exposed to the process fluid.

In some process environments, the process fluid may experience relatively high temperatures. However, transmitters may have a maximum operating temperature of 185° F. Certain transmitters designed for high temperature operation may extend this to 250° F. to 300° F. Temperature extremes can still cause errors in pressure measurements. In processes which have temperatures which exceed the maximum temperature of the pressure transmitter, the transmitter itself must be located remotely from the process fluid and coupled to the process fluid using a capillary tube. The capillary tube can run many feet and an isolation fluid is carried in the tube. One end of the tube mounts to the process through an isolation diaphragm and the other end of the tube couples to the pressure transmitter. This capillary tube and isolation diaphragm is generally referred to as a "remote seal."

It can be advantageous in some remote seal applications to utilize fill fluids that can further increase the process temperature range with which the transmitter can work. To handle higher process temperatures, fill fluids capable of working at higher temperatures can be used. However, some such fill fluids are either a solid or are extremely viscous at cold ambient temperatures, and may even be so at room temperature.

It is desirable to allow a transmitter to be calibrated at room temperature and/or to be able to transmit and read pressure in a reasonable amount of time at cold ambient conditions before a hot process is brought completely up to temperature. If the fill fluids are solid or too viscous at room temperature, such calibration may not be possible. A heating device can be used to heat the transmitter or remote seal to temperatures at which the high temperature fill fluids have sufficiently low viscosity, but some components of the transmitter or of the remote seal may be damaged at these higher temperatures. For example, even with the use of a high temperature fill fluid, an intermediate fill fluid, with a lower temperature limit, will typically be used to convey process pressures between the high temperature fill fluid and the pressure sensor. This intermediate fill fluid may not be able to withstand heating.

SUMMARY

A pressure transmitter assembly for measuring a process pressure of an industrial process includes a pressure sensor configured to sense the process pressure. A process coupling couples the pressure sensor to the industrial process. In one example configuration, a phase change material carried in the process coupling is configured to reduce heat transfer from the industrial process to the process variable sensor by changing phase in response to heat from the industrial process. In another example configuration, a thermocouple electric cooling (TEC) element is coupled to the process coupling and configured to conduct heat away from the coupling in response to an applied electric current.

A pressure transmitter assembly for measuring a process pressure of an industrial process includes a pressure sensor configured to sense the process pressure. A process coupling couples the pressure sensor to the industrial process using an elongate housing with a fill fluid capillary. In one example configuration, at least one thermoelectric element is included within the elongate housing to apply heat to, or conduct heat away from, the process coupling in response to an applied electric current or signal, allowing fill fluid to be preheated to facilitate cold startup or calibration, and providing cooling of the process coupling during high temperature operation.

This Summary and Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

DETAILED DESCRIPTION OF ILLUSTRATIVE EMBODIMENTS

The present invention is directed to industrial transmitters of type used to measure a process variable of a process fluid in which the process fluid and/or process environment may experience relatively high temperatures. Configurations are provided to reduce the heat transferred from the industrial process to the process variable sensor and transmitter electronics. In one example configuration, a phase change material is employed to reduce heat transfer. In another example configuration, a thermal electric or thermoelectric cooling (TEC) element is provided to reduce the heat transfer. These configurations may be implemented independently or in combination. The configurations do not require the remote seal technique discussed in the background section. In these and/or other configurations, heat can be applied by one or more thermoelectric elements or devices to pre-heat high temperature fill fluid within a capillary of a process coupling to allow cold-startup or calibration. Heat applying configurations can be implemented independently or in combination with heat reduction configurations.

Electronic industrial pressure transmitters which are employed in the process industry such as pharmaceutical, biotechnology, food and beverage technologies and others, often have special requirements. For example, they may often be required to measure the pressure of process fluid at very high temperatures. They are often required to survive very high temperatures during cleaning processes which occur between both "batches" of processing. The cleaning processes are referred to as "Clean In Place" (CIP) and/or "Sterilize In Place" (SIP). These processes expose process interfaces to temperatures of over 200° C. Further, it is desirable that the pressure measurement transmitter not only survive the cleaning process, but also provide minimal error during and after the cleaning process. This allows the next "batch" to begin processing as soon as possible. If the errors are present during the cleaning process, then it is desirable that the measurement device return to its calibration parameters quickly and without a shift in the output following the cleaning process.

Conventional industrial pressure transmitters are capable of surviving and performing nominally at temperatures of up to about 185° F. Some specifically designed transmitters configured for high temperature operation may extend this to 250° F. to 300° F. However, beyond these temperatures, substantial errors and/or complete failure of the device may occur, for example due to overheating of electronic components. As discussed in the Background section, remote seals (secondary fill systems, also referred to as chemical seals) can be used to meet the needs of high temperature process environments. These seals can often survive temperatures beyond 400° F. However, such configurations have a number of drawbacks. For example, substantial measurement errors may be associated with increased process temperature, as much as 15%. Further, the configuration may lead to poor temperature transient behavior, i.e., large errors and slow recovery. The configuration also introduces drift and non-repeatable errors when returning from high temperature cleaning to the baseline operating temperature. They may also not be able to accurately measure pressure during the cleaning process.

The industrial pressure transmitter of the present invention provides improved performance in high temperature processes, and in processes which experience intermittent high temperatures such as those experienced during tank cleaning (CIP and SIP). In some embodiments, the improvements include the increased high process temperature capability and reliability, reduced errors during measurement while under high process temperatures, reduced errors when returning to normal operation from high temperatures, and improved speed of return from transient temperatures.

Figure 1:
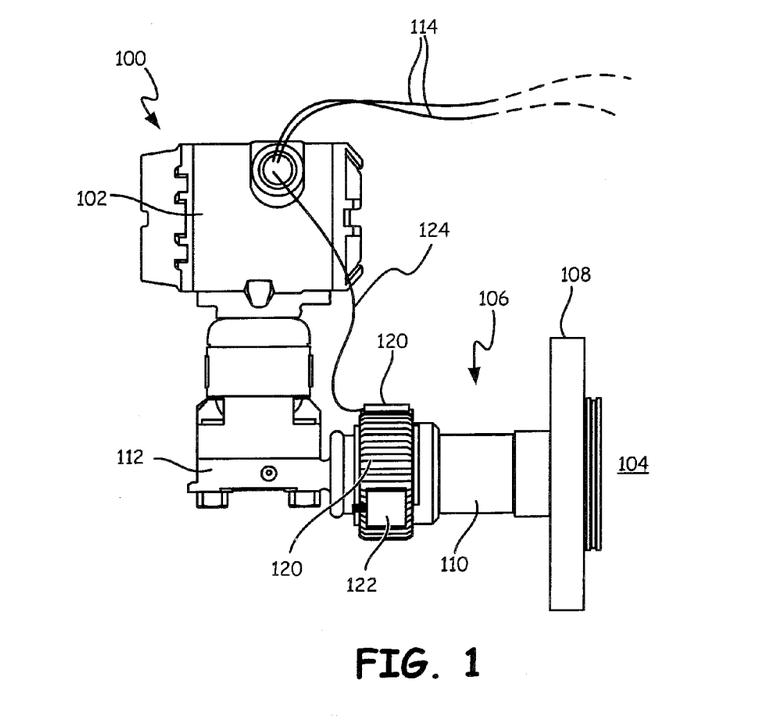
FIG. 1 is a side plan view of a process variable transmitter assembly coupled to an industrial process.
Figure 2:
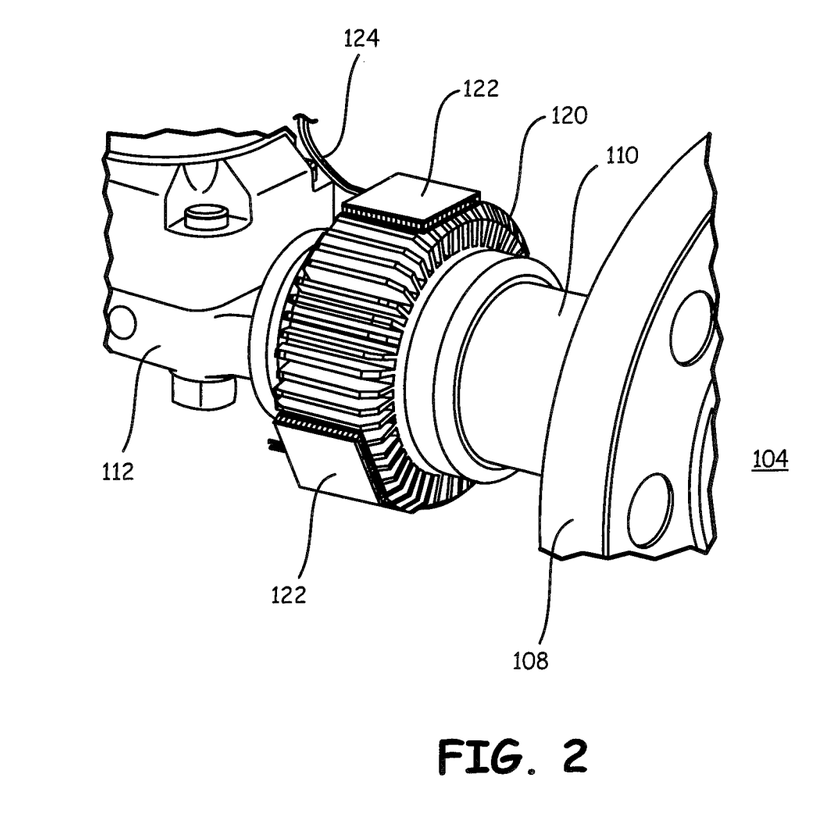
FIG. 2 is an enlarged perspective view of the process variable transmitter assembly of FIG. 1.

FIG. 1 is a side plan view and FIG. 2 is a partial perspective view of a pressure transmitter assembly 100 which includes a pressure transmitter 102 coupled to an industrial process fluid 104 through a process coupling 106. In some embodiments, coupling 106 can include a process flange face 108 configured to mount to a process vessel such as a container, pipe etc. However, other types of mounting components can be used instead of a process flange, including for example clamp or threaded connection type mounts. While disclosed embodiments are described with reference to a process flange mount, those of skill in the art will understand that other mounts can be used instead and that disclosed embodiments include usage of these other types of process mounts.

A pressure from a process fluid 104 is conveyed through the flange 108, through a capillary tube 302 (shown in FIG. 3) carried in an elongate housing 110 and to a transmitter flange 112 of process variable transmitter 102. A pressure sensor (not shown in FIG. 1 or 2) in the process variable transmitter 102 senses the applied process pressure. Information related to the sensed applied sensed applied process pressure is conveyed to another location. For example, a remote process control room through a two-wire process control loop. An example two-wire process control loop 114 is illustrated in FIG. 1 and may operate in accordance with any appropriate protocol including the HART® communication protocol in which digital information is modulated on to a 4-20 mA current, the Foundation Fieldbus or Profibus communication protocols, etc., or through a wireless communication protocol such as the WirelessHART® communication protocol in accordance with IEC 62591.

FIGS. 1 and 2 also illustrate a heat sink 120 of the process coupling 106. Heat sink 120 consists of a plurality of fins and is thermally coupled to the elongate housing 110. In one embodiment, thermal electric cooling elements 122 thermally couple to heat sink 120. Thermal electric cooling elements 122 are electrically coupled to circuitry (not shown in FIG. 1) within the transmitter 102 through electrical connection 124.

Figure 3A:
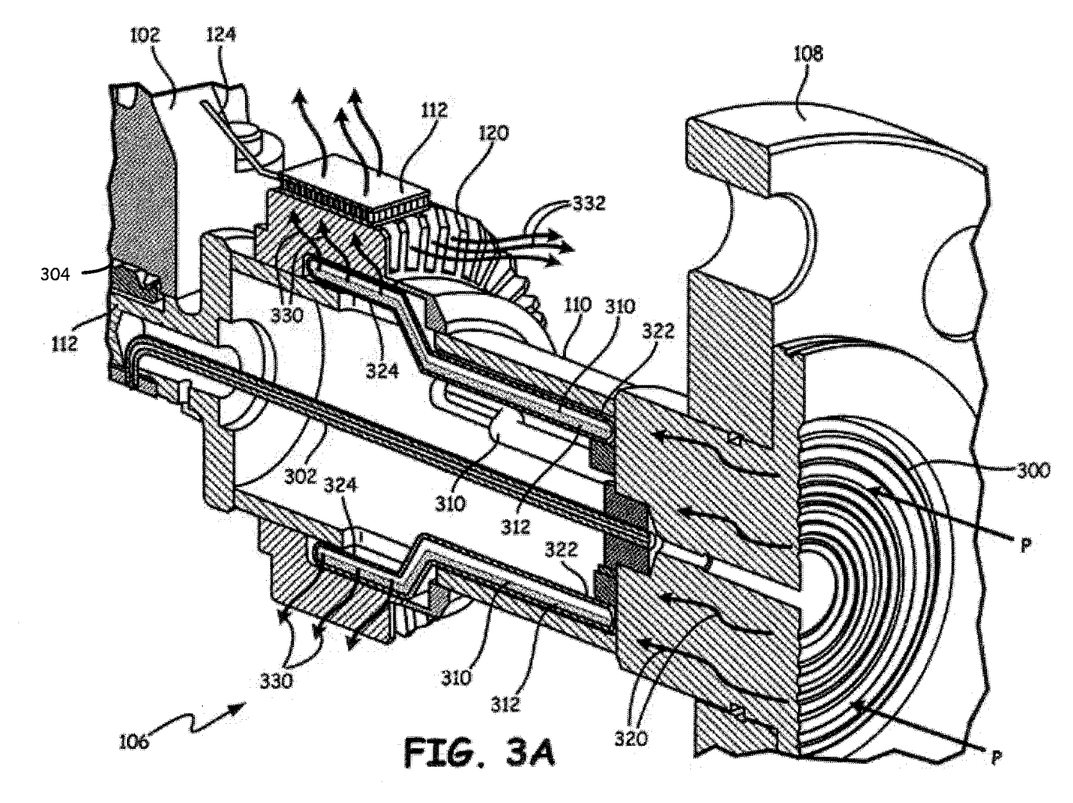
FIG. 3A is a side perspective, cross sectional view of the process variable transmitter assembly of FIG. 1.
Figure 3B:
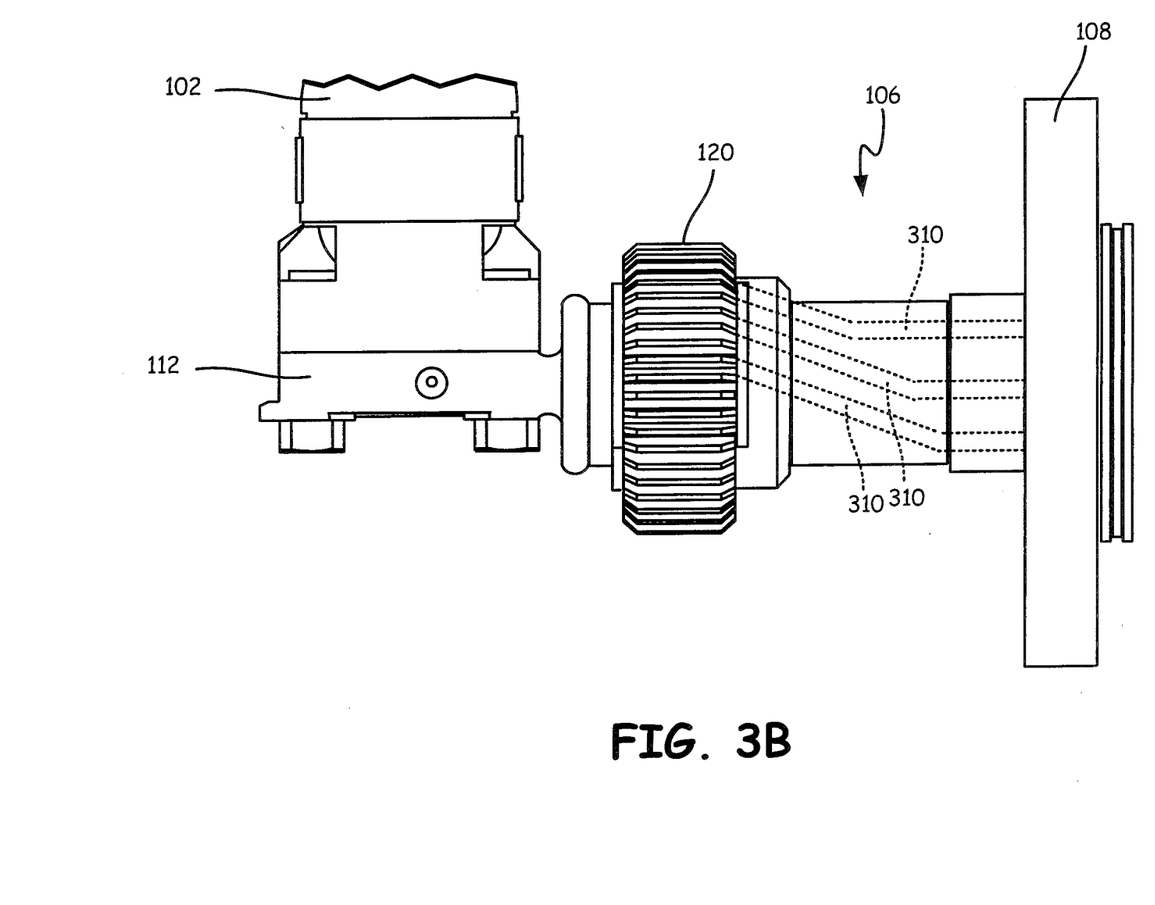
FIG. 3B is a side plan view of the process variable transmitter assembly of FIG. 1.
Figure 3C:
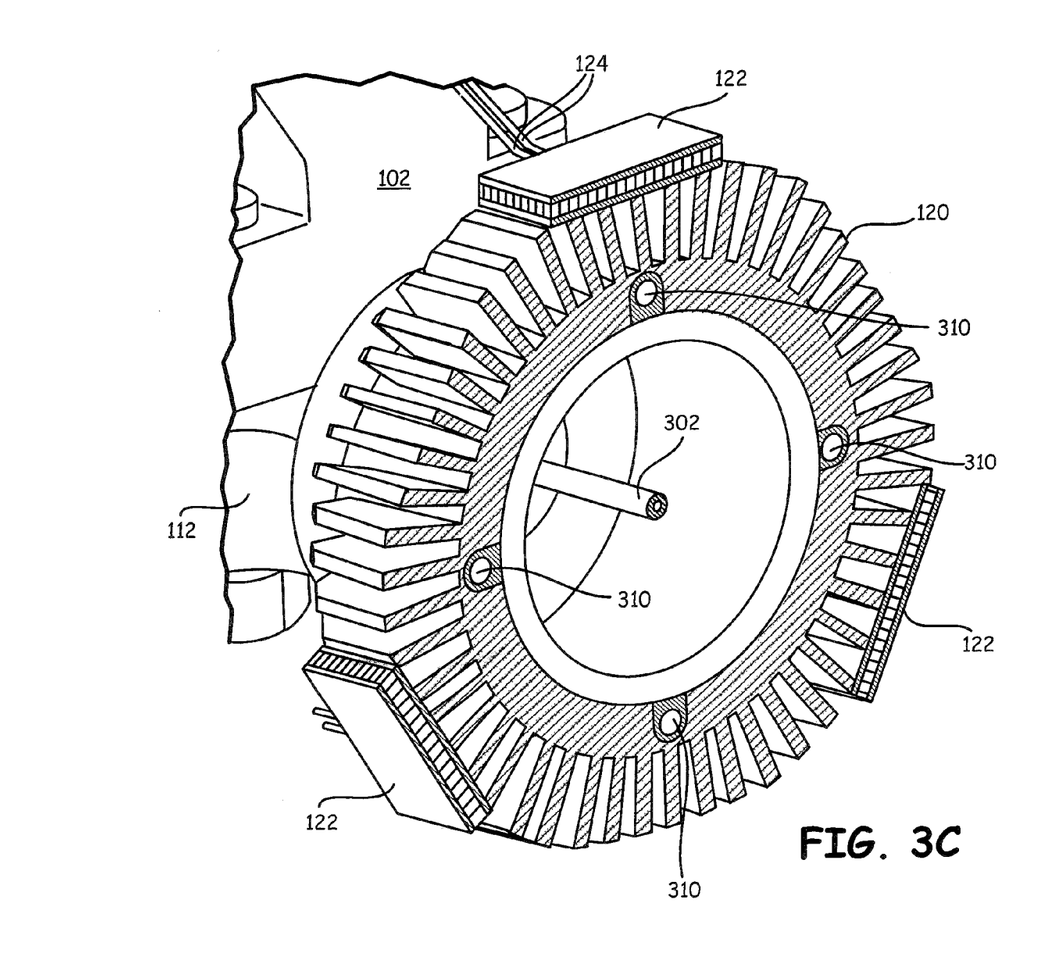
FIG. 3C is a side plan, cross sectional perspective view illustrating a heat sink, phase change material and thermal electric cooling elements.

FIG. 3A is a cross sectional perspective view, FIG. 3B is a side plan view and FIG. 3C is a cutaway perspective view showing process coupling 106 in greater detail. As illustrated in FIG. 3A, process flange face 108 includes an isolation diaphragm 300 configured to receive a process pressure P from process fluid 104. On the opposite side of isolation diaphragm 300 is an elongate capillary tube 302 which extends through elongate housing 110. Capillary tube 302 carries an isolation fluid which is preferably incompressible such as an oil. Capillary tube 302 extends to a second isolation diaphragm 304 which itself couples to isolation fluid which extends to the pressure sensor (not shown) in transmitter 102 which is not illustrated in FIG. 3A. As pressure is applied to the diaphragm 300, this pressure is transferred to the isolation fluid within capillary tube 302 and to isolation diaphragm 304.

FIGS. 3A and 3B also illustrate closed phase change material (PCM) tubes 310. PCM tubes 310 carry a phase change material (PCM) material 312 therein. Heat from the process fluid 104 which is transferred through flange 108 is illustrated by arrows 320. This heat causes the heating of the phase change material 312 within tubes 310. The heating causes the PCM material 312 to change state, for example, from a liquid to a gas state. The phase change requires additional energy, known as the "heat of vaporization" to be drawn from the flange face 108. After the PCM material 312 changes state, it flows from a process end 322 of tubes 310 to a transmitter end 324. For example, in the gaseous state, the PCM material 312 may weigh less than when in a solid state. If the coupling 106 is oriented such that the transmitter ends 324 are higher than the process ends 322 of tubes 310, the gaseous phase change material 312 will tend to flow away from the flange 108 and toward the process ends 324. This causes heat from the process fluid 104 to be drawn away from flange 108 and toward heat sink 120 as illustrated by arrows 330. The PCM tubes 310 may be arranged axially around the elongate housing 110 for effective use in horizontal or vertical mount arrangements, for example as shown in the exemplary implementation of FIG. 3B. As air moves past the fins of the heat sink 120, heat is drawn away from the heat sink 120 as illustrated by arrows 332. This process allows the PCM material 312 to cool and change state. For example, the material may change from a gaseous state to a liquid state, or from a liquid state to a solid state. In this process, the PCM material returns to the process ends 322 of tubes 310 whereby the cooling cycle may repeat. The PCM material may be selected as desired. Example preferred materials include water, Aromatic (DEB), Silicate-ester (Coolanol 25R), Aliphatic (PAO), Silicone (Syltherm XLT), Fluorocarbon (FC-77), EG/Water (50:50 (v/v)), PG/Water (50:50 (v/v)), Methanol/Water 40:60 (wt./wt.), Ethanol/Water 44:56 (wt./wt.), and Potassium Formate/Water 40:60 (wt./wt). As the PCM material changes state from a liquid to a gas (or a solid to a liquid), this phase transition requires more heat be transferred from the process. This is known as "the heat of fusion" of the material. Similarly, as the phase change material transitions from a gas to a liquid (or from a liquid to a solid), it gives off a large amount of heat energy due to its high heat of fusion. The material should be selected to not only have a high heat of fusion, but also have a phase change which occurs at a desired temperature based upon the temperature of the industrial process and the desired operating temperature range of the process variable transmitter 112.

Preferably, the tubes 310 are arranged such that the PCM material flows in a direction toward the heat sink 120. This flow may, for example, be due to the effect of gravity on the system. For example, in a gas phase, the PCM material may flow in an upwardly direction whereas in a liquid phase, the PCM material may tend to settle at a physically lower point in the system. Thus, as illustrated in FIG. 3A, the heat sink 120 may be oriented at a higher position than the flange face 108. FIG. 3B shows another example configuration in which this system is arranged horizontally. In such a configuration, the PCM tubes 310 can be directed in an upward direction as they extend from flange face 108 to the heat sink 120. However, other configurations may also be implemented.

FIGS. 3A and 3C also illustrate thermal electric cooling elements 122 coupled to the heat sink 120. These can be controlled by circuitry contained within the transmitter 102. Thermal electric cooling elements 122 operate in accordance with known techniques. When a current has passed through elements 122, heat is transferred in a direction determined by the direction of the applied current. Thus, thermal electric cooling elements 122 can be used to draw additional heat away from heat sink 120 and thereby accelerate the cooling process of the phase change material 312. Elements 122 may be used independently and do not require the use of a phase change material or a heat sink if desired. Any number of thermal electric cooling elements may be arranged around the conduit. Such elements generally operate in accordance with the Seebeck effect in which an electrical potential created at a junction of two dissimilar metals will cause heat to be transferred across the junction. Similar electric coolers are also known to use the Peltier effect to create a heat flux between two different dissimilar types of materials. For example, n-type and a p-type semiconductor materials can be placed together and used to create a thermal electric cooling element. The amount of the heat transfer is related to the applied voltage. When a voltage is applied to the element, a DC current flows across the junction causing the temperature difference to arise.

Figure 4:
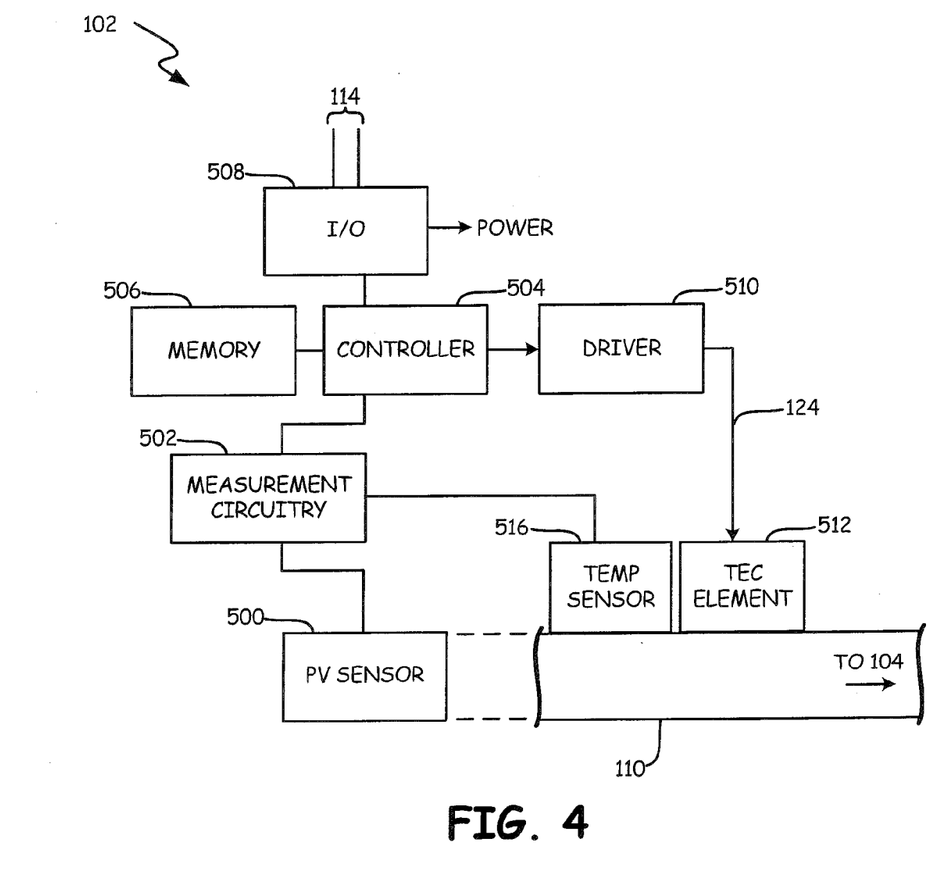
FIG. 4 is a simplified block diagram of the process variable transmitter assembly of FIG. 1.

FIG. 4 is a simplified block diagram showing components of process variable transmitter 102. In FIG. 4, a process variable sensor 500 is illustrated which, as discussed above, may be a pressure sensor. Sensor 500 couples to the process 104 through elongate housing 110 as described above. An output from the process variable sensor is provided to measurement circuitry 502. Such circuitry may include, for example, an analog to digital converter, filtering circuitry, etc. A digitized output is provided to controller 504 for measurement circuitry 502. Controller 504 may comprise, for example, a microprocessor or the like, which operates in accordance with programming instructions stored in memory 506. Controller 504 provides an output based upon the sensed process variable using input/output circuitry 508. In FIG. 4, I/O circuitry 508 is illustrated as connecting to the process control loop 114. However, the invention is not limited to such a configuration. In one example, I/O circuitry 508 also provides a power output which provides power to electrical components of the process variable transmitter 102. For example, such power may be derived from the process control loop 114.

Process variable transmitter 102 also includes driver circuitry 510 which couples the thermal electric cooling element 512. Driver circuitry may comprise, for example, circuitry which applies an electrical current to element 512. Such a current may comprise, for example, a direct current having a polarity which causes element 512 to draw heat away from elongate housing 110.

FIG. 4 also illustrates an optional temperature sensor 516. In the configuration illustrated in FIG. 4, the output from the temperature sensor 516 is provided to measurement circuitry 502 for use by controller 504. Temperature sensor 516 allows a feedback control mechanism to be used to control operation of thermal electric cooling element 512. For example, if the temperature of conduit 512 is below a maximum desired threshold, the controller 504 can turn off element 512 using driver circuitry 510. Similarly, the amount of cooling afforded by thermal electric cooling element 512 can be controlled by controlling the electrical current applied by driver circuitry 510. This allows the controller 504 to control the amount of heat which is being drawn away from conduit 112. Thus, if the conduit 112 is at a particularly high temperature, a larger current may be applied to element 512 thereby increasing the rate of heat transferred. Similarly, if the conduit 112 is near a lower threshold temperature, a small amount of current may be applied. Such configurations may be advantageous in order to reduce power consumption. In one example embodiment, a battery or other power storage device is carried in the transmitter 102 for powering the thermal electric cooling element 512.

As discussed, it can be advantageous in some remote seal or other pressure transmitter applications to utilize high temperature capillary fill fluids that can further increase the process temperature range with which the transmitter can work. However, with some such fill fluids being extremely viscous, or even solid, at some ambient temperatures, cold startup of these transmitters can be difficult, as can calibration of the devices.

Figure 5:
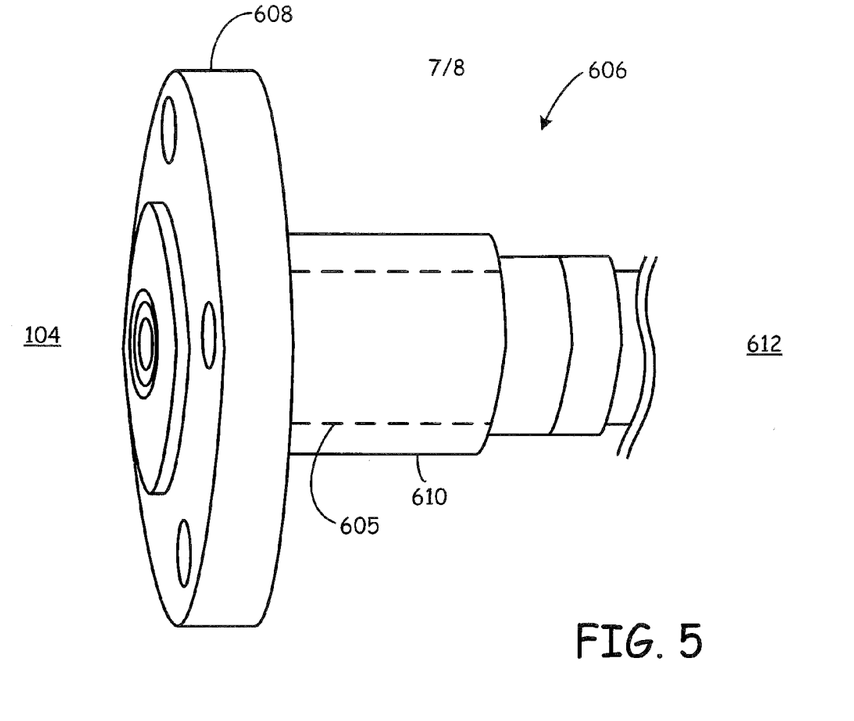
FIG. 5 is a perspective view of a further embodiment of a process coupling of a process variable transmitter assembly.
Figure 6:
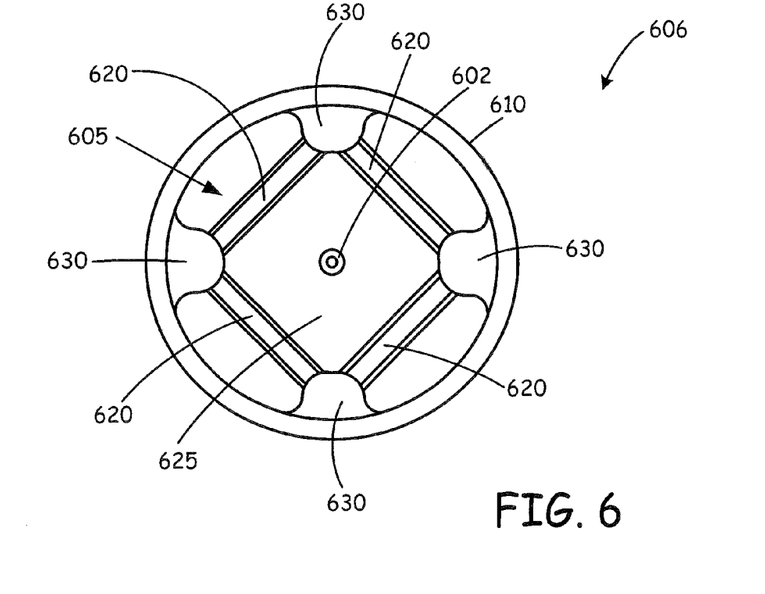
FIG. 6 is a diagrammatic end view illustrating components internal to an elongate housing of the process coupling shown in FIG. 5.

Referring now to FIG. 5, shown is a partial perspective view of a process coupling 606 of a process variable transmitter assembly similar in respects to pressure transmitter assembly 100 shown in FIG. 1. FIG. 6 is a diagrammatic end view illustrating components internal to an elongate housing 610 of the process coupling shown in FIG. 5. The process coupling illustrated in FIGS. 5 and 6 can include some or all of the above-discussed features, but need not include those features in all embodiments. A transmitter or transmitter assembly 702 including the process coupling configuration shown in FIGS. 5 and 6 is illustrated in block diagram format in FIG. 7. Other components of transmitter or transmitter assembly 702 can be as shown and discussed above with reference to FIGS. 1-4.

In exemplary embodiments, process coupling 606 includes a process flange face 608 configured to mount to a process vessel such as a container, pipe, etc. A pressure from a process fluid 104 is conveyed through the flange 608, through a capillary tube 602 (shown in FIG. 6) carried in an elongate housing 610 and to a transmitter flange (shown generally at 612) or other pressure sensor coupling of the process variable transmitter. A pressure sensor (not shown in FIG. 5 or 6) in the process variable transmitter 702 senses the applied process pressure. Information related to the sensed applied process pressure is conveyed to another location, for example, to a remote process control room through a two-wire process control loop 114 as discussed above with reference to FIG. 1.

In some embodiments, capillary 602 contains a high temperature fill fluid which allows the transmitter to be used with higher temperature process fluids. However, as discussed, some such high temperature fill fluids are highly viscous at lower or even room temperature, making cold startup difficult. To facilitate use of high temperature fill fluid in such instances, fill fluid temperature control mechanism 605 can be included within elongate housing 610. Temperature control mechanism 605 includes, in exemplary embodiments, one or more thermoelectric elements or devices positioned within elongate housing 610 and configure to generate heat energy to raise or maintain the temperature of the fill fluid. The same thermoelectric elements can be used to remove heat from the process coupling to lower or maintain the temperature of the fill fluid.

As shown in FIG. 6, in exemplary embodiments, temperature control mechanism 605 includes at least one, and typically multiple, thermoelectric elements 620 positioned within elongate housing 610. In one exemplary embodiment, four thermoelectric elements 620 are included and positioned adjacent to capillary 602. The thermoelectric elements 620 can be positioned such that they substantially surround capillary 602, each positioned on a side opposite another, though this need not be the case in all embodiments. Thermoelectric element mounts 630 can be included within housing 610 to secure and position the thermoelectric elements. Electrical connections 724 (shown in FIG. 7) to the thermoelectric elements can routed through mounts 630, in spaces between the elements 620 and the housing 610, or elsewhere.

In exemplary embodiments, temperature control mechanism 605 also includes a central heat sink 625 positioned within housing 610, between the thermoelectric elements 620 and capillary 602, to aid in conducting heat energy between the thermoelectric elements and the capillary. The heatsink material is ideally highly thermally conductive to allow efficient heat transfer between elements 620 and fill fluid within capillary 602, and to provide thermal transfer to keep the fill fluid at its higher temperature during operation to improve time response of the system and to protect heat sensitive elements or intermediate fluids. Heat sink 625 can be positioned in direct contact with the thermoelectric elements 620 and capillary 602. In the alternative, heat sink 625 can be coupled to thermoelectric elements 620 and capillary 602 through other thermally conductive materials such as thermal pastes, etc. Heat sink 625 can be configured to surround capillary 602 along a portion of the length of the capillary, or along the entire length of the capillary. In embodiments in which heat sink 625 extends only partially along a length of capillary 602, the heat sink 625 and thermoelectric elements 620 can be positioned more proximate to the process end of elongate housing 610 than to the transmitter or pressure sensor end of the elongate housing in order to prevent excessive heat transfer to the transmitter.

To heat capillary 602, thermoelectric elements 620 are controlled to generate heat responsive to electric current or signals and the heat energy is transferred through heat sink 625 to capillary 602 and the fill fluid contained therein. To cool capillary 602 and the fill fluid, thermoelectric elements 620 are controlled to absorb heat responsive to electric current or signals and heat energy is transferred through heat sink 625 from capillary 602.

Figure 7:
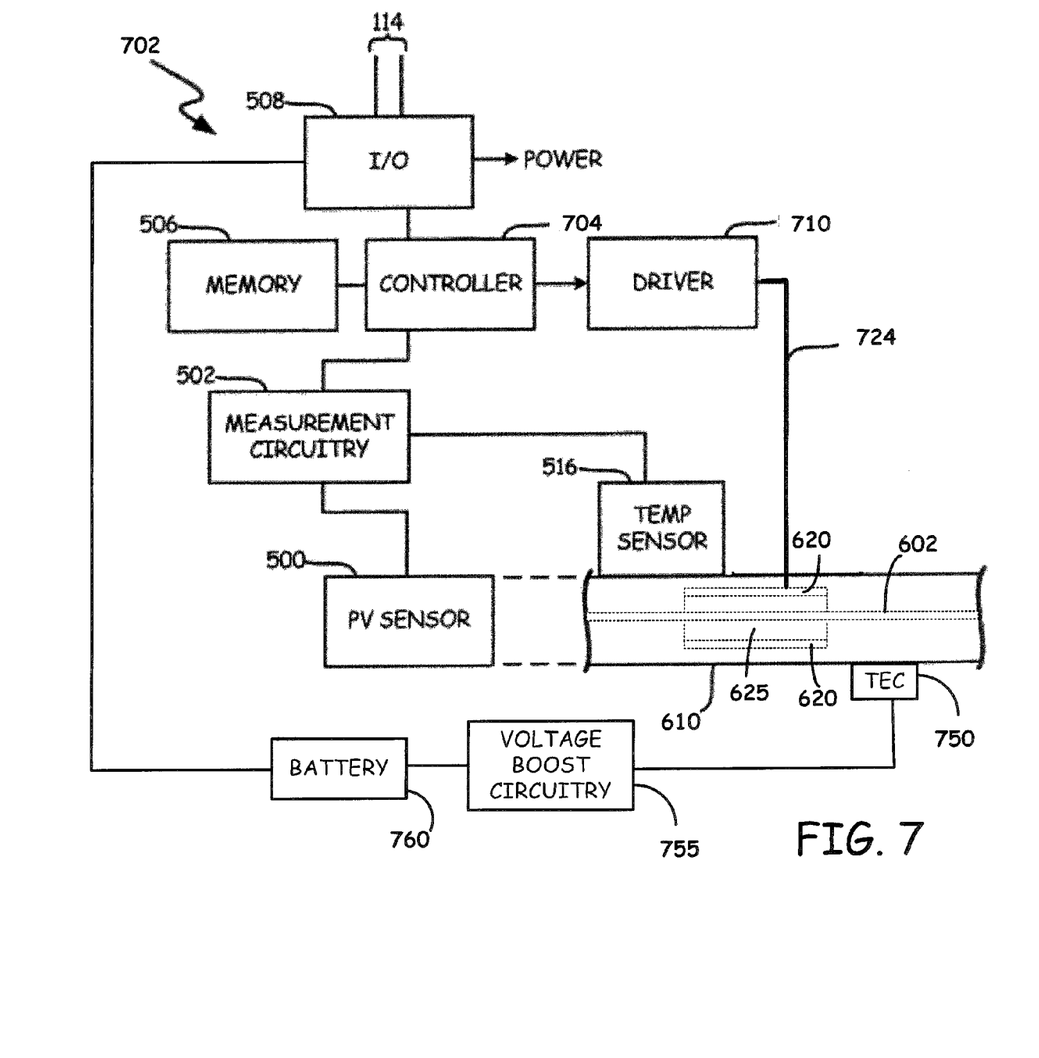
FIG. 7 is a simplified block diagram of a process variable transmitter embodiment including the process coupling shown in FIG. 5.

Referring now to FIG. 7, shown is a simplified block diagram similar to that shown in FIG. 4, and showing components of process variable transmitter 702 which can be an embodiment of transmitter 102. Like components in FIG. 7 are similarly numbered with corresponding components in FIG. 4, and description of those components is as discussed above. In FIG. 7, process variable sensor 500 is illustrated which, as discussed above, may be a pressure sensor. Sensor 500 couples to the process 104 through elongate housing 610 as described above. An output from the process variable sensor is provided to measurement circuitry 502. A digitized output is provided to controller 704 for measurement circuitry 502. Controller 704 may comprise, for example, a microprocessor or the like, which operates in accordance with programming instructions stored in memory 506. Controller 704 provides an output based upon the sensed process variable using input/output circuitry 508. In FIG. 4, I/O circuitry 508 is illustrated as connecting to the process control loop 114. However, the invention is not limited to such a configuration. In one example, I/O circuitry 508 also provides a power output which provides power to electrical components of the process variable transmitter 702. For example, such power may be derived from the process control loop 114.

Process variable transmitter 702 also includes driver circuitry 710 which couples to the one or more thermoelectric elements 620. Driver circuitry 710 may comprise, for example, circuitry which applies an electrical current to elements 620 responsive to commands from controller 704. Such a current may comprise, for example, a direct current having a polarity which causes elements 620 to apply heat through heatsink 625 to capillary 602, or draw heat away from elongate housing 110.

FIG. 7 also illustrates an optional temperature sensor 516. In the configuration illustrated in FIG. 7, the output from the temperature sensor 516 is provided to measurement circuitry 502 for use by controller 704. Temperature sensor 516 allows a feedback control mechanism to be used to control operation of thermoelectric elements 620. For example, if the temperature within housing 610 is below a minimum desired threshold for the high temperature fill fluid within capillary 602, the controller 704 can cause thermoelectric elements 620 to apply heat energy using driver circuitry 710. Alternatively, if the temperature within housing 610 is above a maximum desired threshold, the controller 704 can cause thermoelectric elements 620 to absorb heat energy using driver circuitry 710. Also, in some embodiments, the controller 704 can control the amount of heating or cooling afforded by the thermoelectric elements 620 based upon how close the sensed temperature is to a threshold temperature, with larger currents applied to elements 620 to increase the heat transfer rate when beneficial.

FIG. 7 also illustrates optional thermoelectric element or elements 750, which can be some or all of thermoelectric elements 620, or which can be a different thermoelectric element or set of thermoelectric elements. Thermoelectric elements 750 utilize a differential temperature between the process temperature and a second temperature such as ambient temperature to harvest electrical energy. Voltage boost circuitry 755 can also optionally be included and coupled to thermoelectric elements 750 to boost a voltage output of thermoelectric elements 750, with the boosted voltage signals provided to battery 760 for charging the battery. The battery 760 is coupled to other circuitry of transmitter 702, for example to input/output circuitry 508 or other circuitry, to provide power for powering the transmitter functions, including powering some or all wireless transmitter functions in some exemplary embodiments. Also, in some embodiments, the power harvested from the process using thermoelectric elements 750 is used for heating and/or cooling using thermoelectric elements 620.

Disclosed embodiments utilize thermoelectric elements or devices for both heating and cooling of pressure transmitters and remote seal devices. As discussed, the thermoelectric elements or devices can be used to heat the small amount of high temperature fill fluid within a capillary to its ideal operating range to allow room temperature or cold temperature start up/calibration. This only requires a small amount of energy that can be stored in a battery or obtained from a process control loop. An alternate function, however, is to cool the elongate housing of a remote seal device during high temperature operation. If desired, the larger amount of energy required for this can be obtained almost entirely from the large thermal gradient between the hot process temperature and the required cooler ambient temperature that the transmitter needs to operate in. Also, if desired, electrical energy obtained using this thermal gradient can be used to charge a battery for wireless pressure transmitter operation.

Although the present invention has been described with reference to preferred embodiments, workers skilled in the art will recognize that changes may be made in form and detail without departing from the spirit and scope of the invention. As discussed above, the thermal electric cooling elements and/or the phase change material discussed above can be implemented In combination or individually. Although the components are illustrated as arranged around a conduit, other configurations may also be implemented. In some instances, it may be desirable to apply heat to a conduit. The thermal electric cooling element can be used in such a situation by reversing the voltage applied to the driver 510. Further, in one configuration, the temperature sensor 516 is included within the TEC element 512. Similarly, the feedback circuitry may also be included within element 512 as can a power source. In such a configuration, it may be possible to use a TEC element 512 without a connection to the field device 102. Although cooling is discussed generally herein, the thermoelectric cooling element can also be operated in a reverse configuration in which the conduit is heated. Further, although in the configurations illustrated, the closed tubes which carry the phase change material extend from the flange face 108 to the transmitter 102, other configurations may also be implemented. The PCM tubes 310 do not necessarily need to extend the entire length of the elongate housing 110. Further, although tubes are illustrated, other configurations may also be implemented. When in a heated state, it is preferable that the phase change material move to the transmitter end of the tube. When in a cooled state, which is cooler than the heated state, the phase change material moves to the process end of the tube. In one example configuration, the PCM tubes are oriented in an upward direction as they extend from a process coupling to a cooling element such as a heat sink and/or TEC element. The TEC element can be responsive to any appropriate electric signal.

What is claimed is:

1. A process coupling for coupling a process variable transmitter to a process fluid of an industrial process comprising:
    an elongate housing having a process mount configured to couple to the process fluid and an opposed transmitter coupling configured to couple to the process variable transmitter;
    a capillary in the elongate housing which conveys a process pressure at the process mount to the transmitter coupling;

at least one thermoelectric element configured to apply heat to, or conduct heat away from, the process coupling in response to an applied electric signal.

2. The process coupling of claim 1, wherein the at least one thermoelectric element is positioned adjacent to the capillary.

3. The process coupling of claim 2, and further comprising a heat sink positioned between the at least one thermoelectric element and the capillary, the heat sink configured to conduct heat energy between the capillary and the at least one thermoelectric element to apply the heat to, or conduct the heat away from, fill fluid in the capillary.

4. The process coupling of claim 3, wherein the heat sink surrounds the capillary along a length of the capillary.

5. The process coupling of claim 3, wherein the heat sink is in contact with the at least one thermoelectric element and the capillary.

6. The process coupling of claim 3, wherein the at least one thermoelectric element comprises a plurality of thermoelectric elements each positioned on an outer surface of the elongate housing.

7. A pressure transmitter assembly for measuring a process pressure of an industrial process, comprising:
a pressure sensor configured to sense the process pressure; and
a process coupling configured to couple the pressure sensor to the industrial process, the process coupling comprising:
an elongate housing having a process mount configured to couple to process fluid of the industrial process and an opposed coupling configured to couple to the pressure sensor;
a capillary in the elongate housing extending from a process end adjacent the process mount to a pressure end adjacent the opposed coupling, the capillary having a fill fluid contained therein which conveys the process pressure at the process mount to the opposed coupling;
at least one thermoelectric element configured to apply heat to, or conduct heat away from, the process coupling in response to an applied electric signal.

8. The pressure transmitter assembly of claim 7, wherein the at least one thermoelectric element is positioned on the elongate housing adjacent to the capillary.

9. The pressure transmitter assembly of claim 8, and further comprising a heat sink positioned between the at least one thermoelectric element and the capillary, the heat sink configured to conduct heat energy between the capillary and the at least one thermoelectric element to apply the heat to, or conduct the heat away from, the fill fluid in the capillary.

10. The pressure transmitter assembly of claim 9, wherein the heat sink surrounds the capillary along at least a portion of a length of the capillary.

11. The pressure transmitter assembly of claim 9, wherein the heat sink is in contact with the at least one thermoelectric element and the capillary.

12. The pressure transmitter assembly of claim 9, wherein the at least one thermoelectric element comprises a plurality of thermoelectric elements each positioned on the elongate housing.

13. The pressure transmitter assembly of claim 12, wherein the plurality of thermoelectric elements are positioned on opposing sides of the capillary.

14. The pressure transmitter assembly of claim 9, wherein the heat sink and the at least one thermoelectric element are positioned more proximate to the process end than the pressure end such that heat is applied to the fill fluid in the capillary proximate the process end.

15. The pressure transmitter assembly of claim 9, wherein the process coupling includes an isolation diaphragm coupled to the capillary to thereby couple the process pressure applied to the isolation diaphragm to the pressure sensor.

16. The pressure transmitter assembly of claim 7, including a driver circuit configured to provide power to the at least one thermoelectric element.

17. The pressure transmitter assembly of claim 16, including a temperature sensor proximate the process coupling.

18. The pressure transmitter assembly of claim 17, wherein the driver circuit is configured to apply a current to the thermoelectric element in response to a sensed temperature by the temperature sensor.

19. The pressure transmitter assembly of claim 18, wherein the driver circuit is configured to apply current to the thermoelectric element to apply heat to the fill fluid in the capillary.

20. The pressure transmitter of claim 7, and further comprising a battery coupled to one or more of the at least one at least one thermoelectric element and configured to store electrical energy harvested from a process temperature differential for use in providing power for operation of the pressure transmitter.

* * * * *

UNITED STATES PATENT AND TRADEMARK OFFICE
CERTIFICATE OF CORRECTION

PATENT NO. : 9,752,947 B2  
APPLICATION NO. : 15/277129  
DATED : September 5, 2017  
INVENTOR(S) : Paul Ryan Fadell Page 1 of 1

It is certified that error appears in the above-identified patent and that said Letters Patent is hereby corrected as shown below:

In the References Cited Page 2, Column 1: (56):
Under U.S. Patent Documents, please insert --2016/0084725 A1 3/2016 Hoffman et al.--

Page 2, Column 2:
Under Foreign Patent Documents, please insert --WO WO2007/052253 5/2007--

Under Non-Patent Literature Documents, please insert --Notification of Transmittal of the International Search Report and the Written Opinion of the International Searching Authority from PCT/US2016/053895, dated May 12, 2017--

Signed and Sealed this  
Second Day of April, 2019

Andrei Iancu  
*Director of the United States Patent and Trademark Office*